Dec. 3, 1968  L. A. M. PHELAN ET AL  3,413,911
FOOD BROILER
Filed Feb. 12, 1968  4 Sheets-Sheet 3
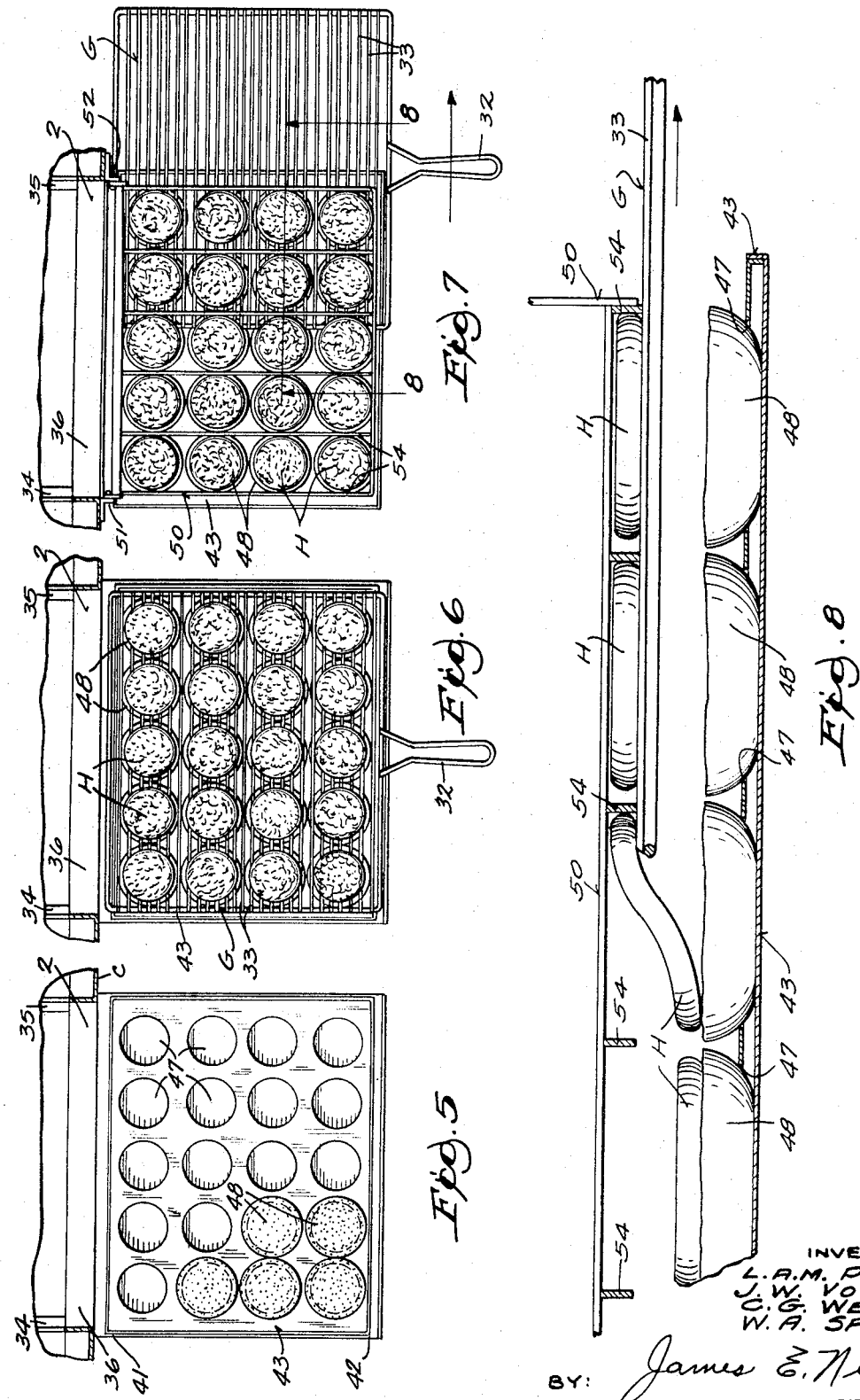
INVENTORS:
L.A.M. PHELAN
J.W. VOS
C.G. WEDIGE
W.A. SPATES
BY: James E. Nilles
ATTORNEY Dec. 3, 1968    L. A. M. PHELAN ET AL    3,413,911
FOOD BROILER
Filed Feb. 12, 1968    4 Sheets-Sheet 4
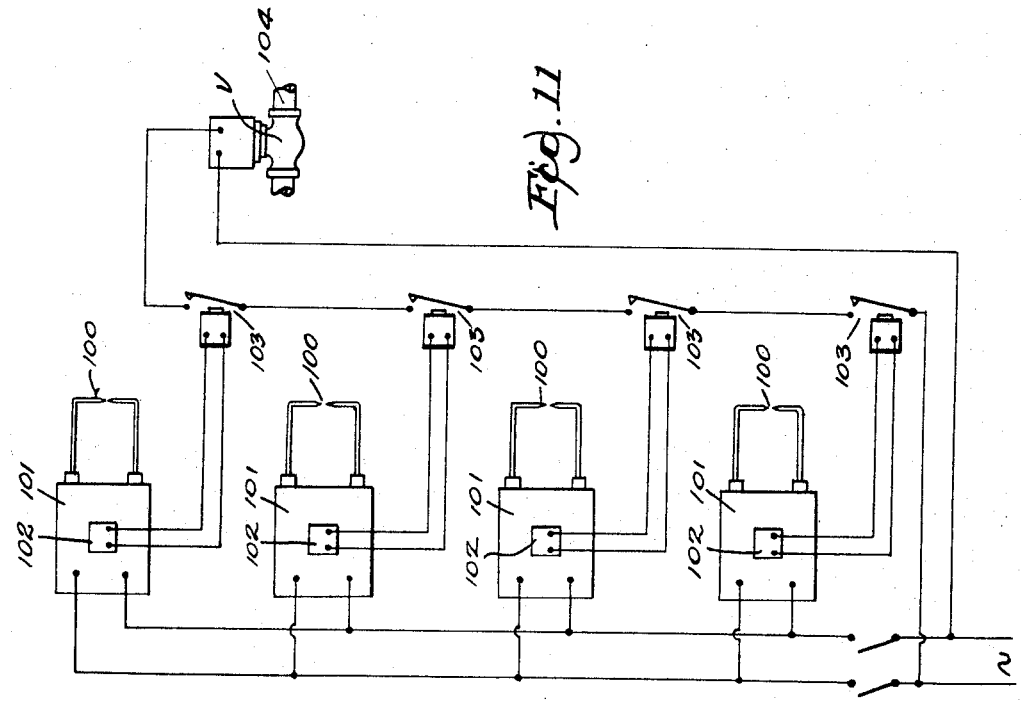
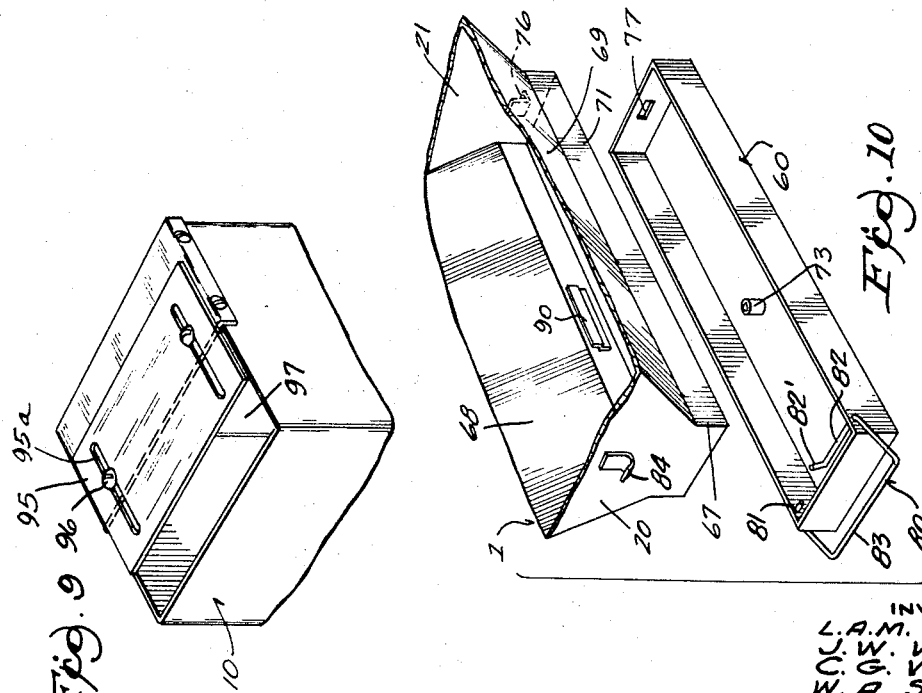
INVENTORS:
L.A.M. PHELAN
J.W. VOS
C.G. WEDGE
W.A. SPATES
BY: James E. Nilles
ATTORNEY

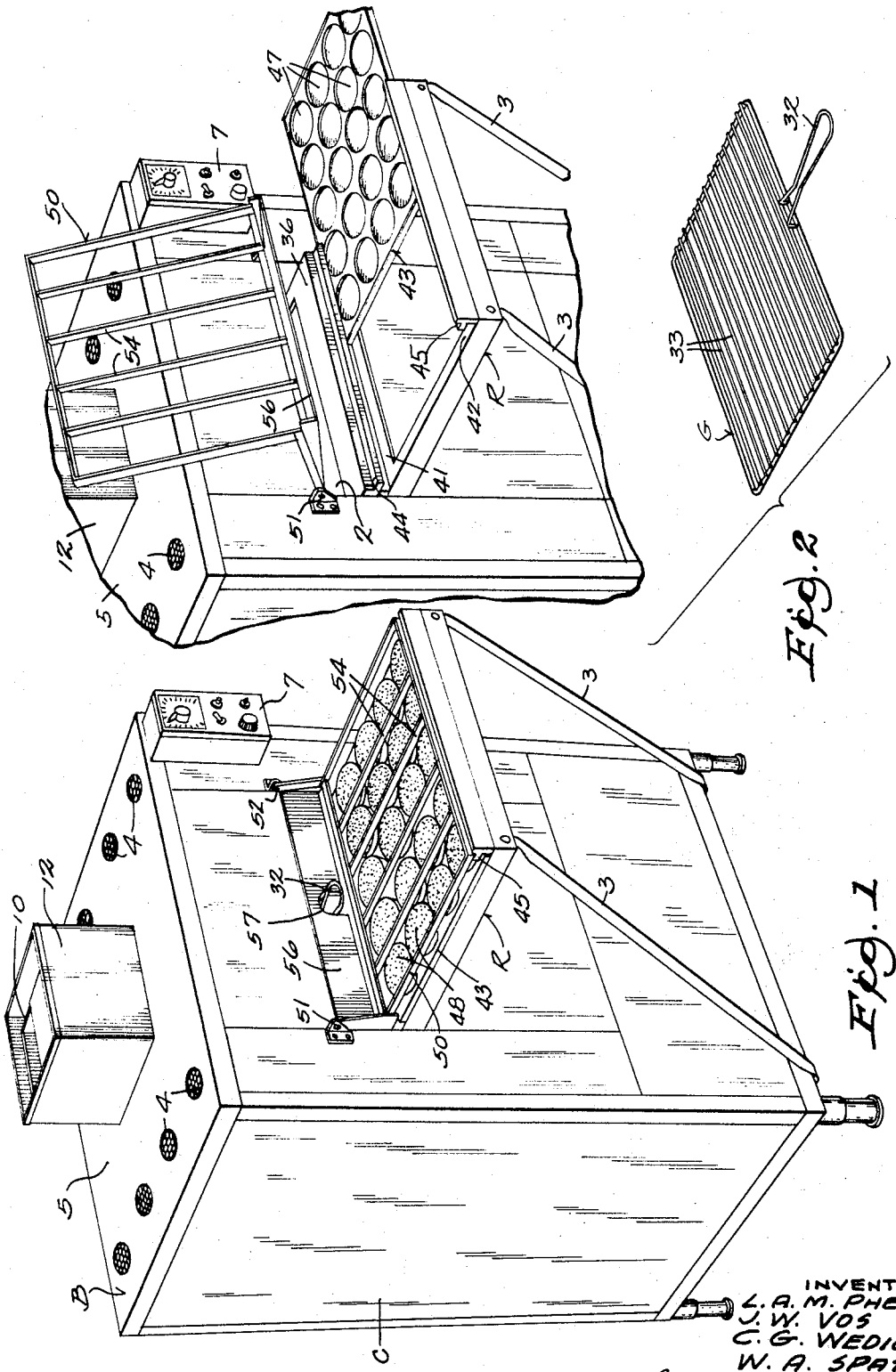

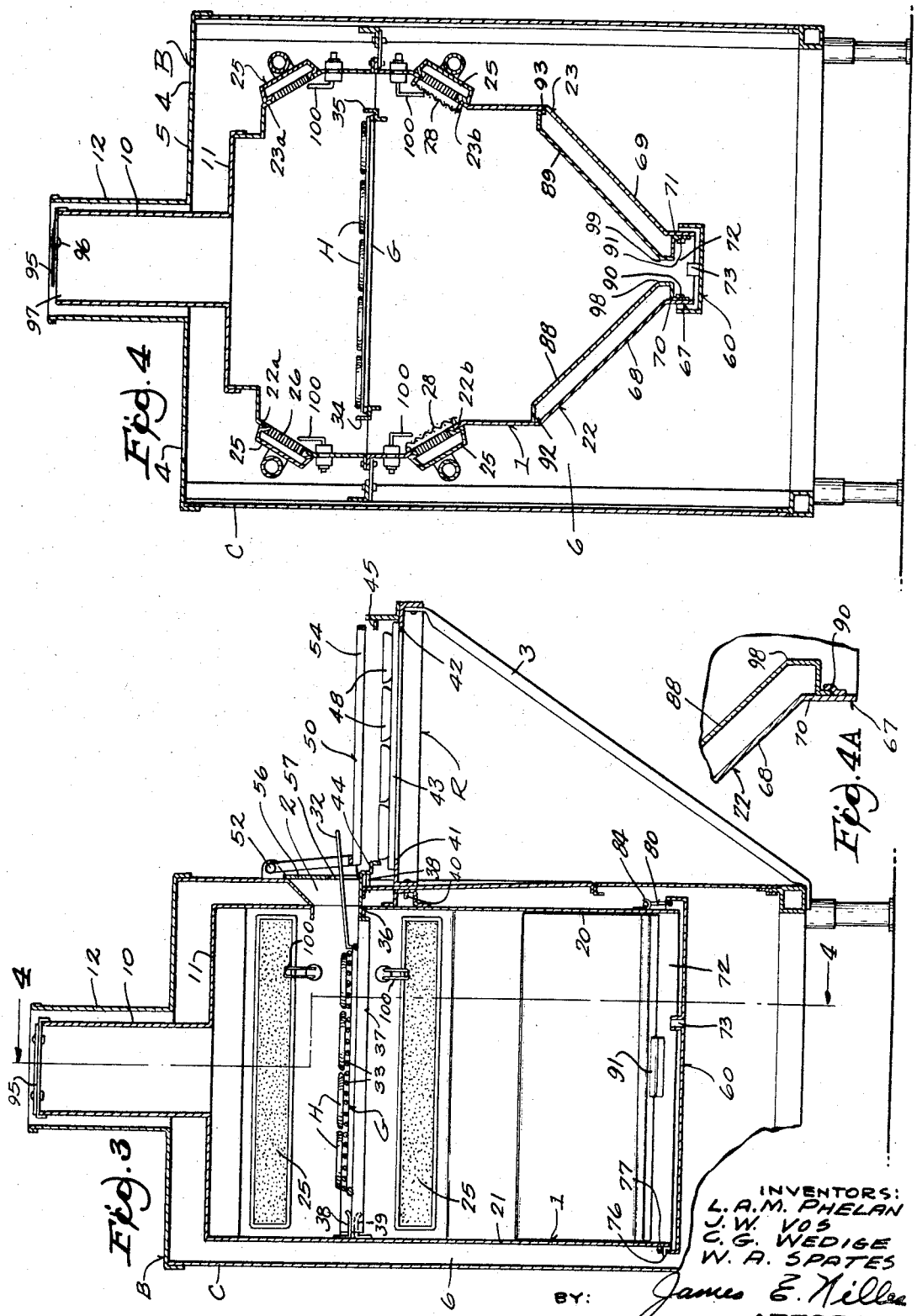

United States Patent Office 3,413,911
Patented Dec. 3, 1968

3,413,911
FOOD BROILER
Louis A. M. Phelan, Roscoe, Ill. 61073, and John W. Vos, Roscoe, Ill., and Cyril G. Wedige and William A. Spates, Beloit, Wis.; said Vos and said Spates assignors to said L. A. M. Phelan, an individual
Filed Feb. 12, 1968, Ser. No. 704,734
9 Claims. (Cl. 99—355)

ABSTRACT OF THE DISCLOSURE

A food broiler of the type utilizing a horizontal, side entrance, and having a loading and unloading rack for the food being broiled which provides for instant transfer of the broiled food, such as hamburgers for example, from the removable grill to pre-positioned buns.

Background of the invention

The invention relates to food broiling apparatus of the infra-red heat type having a horizontal side entrance through which the food is inserted and removed on a sliding grill. The food to be broiled is subjected to intense radiant heat and the cooking chamber is closely controlled as to air content to prevent charring of the food.

Such a process is disclosed and claimed in the U.S. patent to two of the present inventors, L. A. M. Phelan and John W. Vos, Number 2,945,767, issued July 19, 1960, and the apparatus is claimed in their U.S. Patent Number 2,997,941 issued Aug. 29, 1961.

The present invention finds particular utility in quick-order food serving establishments, such as "drive-ins," where many hamburgers, for example, must be prepared in a very short period of time. Heretofore, considerable time was required for loading and unloading the food in and out of the broiler and placing it on the buns. This was not only time consuming, but as the environment and the finished food were hot, efficiency and comfort of the operator left something to be desired.

Summary of the present invention

The present invention provides a broiler of the infra-red heat type having a horizontal, side opening for loading and unloading of the food positioned on a grill that slides in and out of the broiler. The broiler has a horizontal rack located adjacent the opening on which the lower half of buns are pre-positioned. This rack also slidingly supports the wire grill on which the hamburgers are positioned directly above the pre-positioned buns. After the grill and its buns are slidingly removed from the broiler, with the hamburgers located directly above their respective bun half, a push-off frame is lowered and its individual longitudinal frame members are located between the rows of hamburgers. Then the grill is slid horizontally beneath the frame, thereby causing the hamburgers to abut against their adjacent frame members and fall off directly on their respective bun half. Thus the entire grill of hamburgers are all immediately positioned on their bun half with a single horizontal sweeping movement of the grill. The bun halves with their hamburgers thereon can then be removed all together on a tray on which they had previously been located and held in position.

Another aspect of the invention relates to the novel push-off frame which has a door that closes the broiler loading and unloading opening whenever the frame is lowered, thus preventing excess air from entering the otherwise substantially entirely closed broiling chamber.

Another aspect of the invention relates to a broiler of the above type in which the air draft or movement through the broiler is carefully regulated. With the present invention, intense radiant heat is utilized which can finish hamburgers in a very short period of time, for example less than two minutes, and this carefully air balanced chamber prevents food charring and burning which would otherwise occur.

These and other objects and advantages of the present invention will appear hereinafter as this disclosure progresses, reference being had to the accompanying drawings.

Brief description of the drawings

FIGURE 1 is a perspective view of a broiler made in accordance with the present invention, the view being taken generally from the front, left corner of the broiler, and showing the hamburger supporting grill in the broiler and the push-off rack in the down position which causes the door to be closed;

FIGURE 2 is a fragmentary, perspective view of a portion of the broiler but showing the push-off rack in the raised position in which the door is open, the bun pan is partially slid to the right, and the hamburger supporting grill is removed;

FIGURE 3 is a side elevational view, in section, of the broiler and showing the push-off rack in the lower, door shut position, the bun pan in position and grill in the position in the broiler;

FIGURE 4 is a front elevation view of the broiler, in section, the view taken generally along the line 4—4 in FIGURE 3;

FIGURE 4a is an enlarged, fragmentary view of means for holding the removable chamber pans in position;

FIGURE 5 is a plan view of the loading and unloading rack mechanism at the front of the broiler, the view showing the bun-pan with some buns in place;

FIGURE 6 is a view generally similar to FIGURE 5 but showing the grill with hamburgers in place and directly above their respective bun halves;

FIGURE 7 is a view generally similar to FIGURE 6 but showing the grill being slid to the right so as to cause the hamburgers to slide off the grill when they abut against the push-off frame, and fall onto their respective bun halves;

FIGURE 8 is a cross sectional view, taken along line 8—8 in FIGURE 7, but on an enlarged scale, and showing the hamburgers as they are progressively slid off the grill onto their respective bun halves;

FIGURE 9 is a fragmentary, perspective view of the top end of the exhaust duct, on an enlarged scale;

FIGURE 10 is a fragmentary, perspective exploded view of the lower end of the chamber and the fat pan, and FIGURE 11 is an electrical wiring diagram which is used with the present invention.

Description of the preferred embodiments

In describing a preferred form of the invention, reference will be made to the processing of hamburgers and their positioning on halves of hamburgers buns, but it will be appreciated that other types of food can be utilized with the present invention.

The general construction and arrangement of the broiler B includes a generally rectangular outer casing C which encloses and supports the broiler chamber 1. A horizontal rack mechanism R extends from the front side of the broiler and is located adjacent and slightly below the loading and unloading opening 2 of the chamber. Supports 3 extend between the lower portion of the casing and the outer end of the rack so as to rigidly support the latter. Openings 4 are located in the top 5 of the casing for the purpose of permitting heat to escape from the space 6 between the casing and chamber.

A control box 7 is secured on the front of the casing within easy reach of the operator and includes a manually settable, electric motor timer to be referred to later.

The chamber 1 has an exhaust duct 10 extending upwardly from its top side 11 so as to permit gases of combustion and heat to be exhausted from the broiling area within the chamber 1. A chimney 12 extends upwardly from the top 5 of the casing C and surrounds the exhaust duct 10 to thereby permit heat to escape from the space 6 between the casing and chamber 1.

Referring in greater detail to the drawings, the chamber also includes a vertical front wall 20, a vertical rear wall 21, side wall 22 and another side wall 23. The side walls 22 and 23 each have a pair of inclined portions 22a, 22b, and 23a and 23b, respectively, in which gas fired, radiant heat burners 25 are located. Each burner 25 includes a ceramic face 26 containing a multitude of small holes through which a mixture of gas and air pass and is then ignited at the surface of the ceramic face to create an intense infra-red type of heat. These burners are conventional and extend substantially along the entire length of the angularly disposed burner wall portions 22a, 22b, 23a, and 23b on which they are mounted. Such arrangement is shown in the U.S. Patent 3,267,924 which issued on August 23, 1966, to T. C. Payne and which has been assigned to an assignee common to the present application.

If a more detailed description of these burners is deemed to be either necessary or desirable, reference may be had to columns 8 and 9 of the said Phelan et al. Patent 2,945,767.

In order to protect the face of the lower burners, a wire rod screen 28 is secured thereacross. These screens serve to catch fat falling thereon, which fat is then burned off rather than eroding the ceramic face of the burner.

At the front of the broiler, horizontal opening 2 is formed in the chamber front 20 and also in the casing so that a grill G can be loaded with hamburgers H and slid into the broiling chamber 1. The grill is fabricated from rods on which the hamburgers are placed and the grill also includes a handle 32 which can be firmly grasped by the operator.

In order to facilitate the sliding action of the grill into and out of the chamber, guide tracks 34 and 35 are secured inside the chamber on which the grill can slide. The front ends of track 34 and 35 are secured together by cross member 36 to form a generally U-shaped guide track means 37 that can be quickly removed for cleaning. To do this, the rear ends of tracks 34 and 35 simply are pushed into spring clips 38 and 39 (FIGURE 3) that are fixed within the chamber. These clips firmly hold the track means 37 in position, yet permit easy removal thereof.

The loading and unloading rack mechanism R is secured to the front of the broiler by screw 40 and extends horizontally from just below the opening 2 and track means 37. This rack has laterally extending guideways 41 and 42 in which a bun pan 43 can be slid with a sidewise movement. Grill supporting and guiding surfaces 44 and 45 are located just above the guideways 41 and 42, and it is on these guide surfaces 44 and 45 that the grill may rest as shown in FIGURES 5 and 6, prior to its insertion into the broiler and also after it has been removed therefrom.

The grill can also be slid sideways on these guide surfaces 44 and 45 when unloading hamburgers H as shown in FIGURE 7. The grill is fabricated from transversely arranged rods 33 which easily slide beneath the hamburgers when the latter are being removed therefrom.

Referring again to the bun pans 43, it has means, such as holes 47, spaced across its upper side so the bun halves 48 are held in pre-positioned arrangement. There may be a series of these bun pans loaded and stored for use during rush periods. The bun pan is loaded with bun halves and slid sideways on guideways 41 and 42, as shown in FIGURE 2, and into the position shown in FIGURES 5, 6, 7, and 8.

There may also be several grills G, all loaded ahead of time with hamburgers which are spaced for vertical alignment with the bun halves on the bun pan when the loaded grill is also placed in position on the rack as shown in FIGURE 6. Initially, the grill can be placed directly on its guide surfaces 44 and 45 without any sliding action; then the grill and its hamburgers can be lifted slightly by handle 32 and pushed along guide tracks 34 and 35 into the broiler (FIGURE 3); when the meat is finished, say one and three-quarter minutes later, as signalled by the timer, the grill is then slid out of the broiler and directly over the buns, as shown in FIGURE 6.

In order to instantly transfer all of the hamburgers onto their bun halves, a push off frame 50 is swingably attached on pivot pins 51 and 52 on the front of the broiler and above opening 2. The frame 50 is shown in FIGURES 2 and 3 in the upper, broiler loading and unloading position. FIGURE 1 shows the frame 50 in the position while broiling is taking place, and FIGURES 7 and 8 show the frame in push off possible where its individual, longitudinal frame members 54 are engaged by the hamburgers located therebetween when the grill G is then slid to the side as illustrated in FIGURE 7.

A door 56 is secured to frame 50 for swinging therewith and is adapted to close opening 2 when the frame is lowered to the broiling position as shown in FIGURE 1. An opening 57 is provided in the door to permit the grill handle 32 to protrude therefrom. As will appear later, the broiler chamber is substantially closed against the entry of air during broiling.

When the frame is swung to the upper position, the door is also swung therewith to open the door as shown in FIGURE 2 for loading or unloading of the broiler.

The above described mechanism permits extremely rapid loading and unloading of the broiler, insuring that the door is closed at all proper times. The mechanism provides instantaneous transfer of the finished meat to the bun halved with a single, horizontal sweeping movement of the grill. This movement may be to one side or the other, or straight out toward the operator, although the latter direction requires more floor space in that direction. The grills and the bun pans can be loaded ahead of time if desired to further enhance the speed of the entire operation. All of the above can be done with ease and efficiency on the part of the operator and without subjecting him to discomfort. The broiler is easily loaded and unloaded and there is no need to touch the hot meat or grill except for its handle.

Fat pan

As previously mentioned, the flow and amount of air in the broiler must be closely controlled and restricted so as to prevent food charring at the high temperatures involved.

As the meat is broiled, a certain amount of fat drips therefrom and collects in the pan 60 which is quickly removable from the lower, reduced end 67 of the chamber 1. The chamber has downwardly converging side portions 68, 69 which then terminate in the parallel, vertical portions 70, 71. Thus the lower end of the chamber is formed as a rectangular opening 72 which is defined by portions 70, 71 and front and rear walls 20 and 21. This opening 72 is sealed by the accumulation of fat in the pan, the level of which fat rises about the lower end of the chamber, and as determined by the overflow nipple 73 which permits excess fat to drip into a container (not shown).

As taught in the previously mentioned Patents 2,945,767 or 2,997,941, water may also be conducted into the pan to maintain the level of the air sealing liquid in the pan.

It is necessary to remove the pan on occasions for emptying and/or cleaning thereof and means have been provided for doing so from the front end of the machine. As shown in FIGURES 3 and 10, the lower end of the rear wall 21 has an extending projector 76 over which a complementary opening 77 in the rear end of the pan is adapted to be slipped. In order to disengage this connection, it is necessary to shove the pan in a rearward direction. Means are provided at the front end of the pan and chamber, which area is easily accessible to the operator, for insuring that such rearward movement of the pan cannot occur accidentally to spill the contents. For this purpose, a locking handle 80 is swingably mounted, by its inwardly extending ends 81 and 82, in the sides of the front end of the pan. The handle also has a front portion 83 for firm grasping by the operator. The handle also includes an extension 82′ which is formed generally at a right angle to the front portion, which extension abuts against the front wall of the chamber when the front portion 83 is flat against the pan and engaged on a hook 84 fixed on the front end of the chamber. When in this locking position (FIGURE 3), the extension 82′ holds the pan forwardly, and in this locked position the rear end of the pan is securely held on projection 76.

Adjustable duct

With the bottom of the chamber sealed, and with the door 56 which closes the loading opening 2, the chamber is substantially sealed against the entry of excess air. In order to prevent smoke or gas from coming out of the chamber, for instance through the cracks surrounding the door or the handle opening 57, the effective cross sectional area of the duct 10 is adjusted so as to nicely balance any air movement in the chamber. In other words, an adjustable louver or baffle 95 has slots 95a (FIGURE 9) and is slidable and adjustably secured by screws 96 to and across the top of the duct 10 so that only enough air and products of combustion will pass upwardly through the open portion 97 to account for the action of the burners and the small leakage of other air into the chamber.

Stated otherwise, the duct is sized, as to both cross-sectional area and height, to provide for a reduction of pressure in the chamber by relieving the pressure therein. The duct causes a slight suction on the burners, which in turn make the burners draw in slightly more air than otherwise. This creates a condition that makes the burners function properly, that is, they burn more completely.

These broilers are often used in rooms under ventilating hoods of different drawing capacities and therefore the duct can be adjusted as to cross-section to provide for the above mentioned balance of draft, or negative pressure within the chamber. The adjustable louver or baffle 95 permits only enough air and products of combustion will pass upwardly through the open portion 97 to permit proper action of the burners and account for the small leakage of other air into the chamber.

Removable chamber panels

Removable panels 88 and 89 are provided to prevent excessive heating of the fat in the pan 60, and also to facilitate cleaning of the interior of the broiler, particularly as to the fat which would drip on the inclined wall portions 68 and 69.

For these purposes, removable panels 88 and 89 are inserted over respective walls 68 and 69 and can be easily inserted and removed. This is accomplished by securing a bracket 90 and 91 (FIGURE 4a) on the inner surface of broiler walls 68 and 69 into which the lower edges of panels 88 and 89 can be readily inserted. The upper edges 92 and 93 of the panels 88 and 89 simply rest against the inside of the chamber walls, thereby completely covering these inclined walls from fat drippings. These panels can then be removed from the bottom of the chamber in an easy manner, it only being necessary to remove the fat pan 60, then reach in and lift the panels off their brackets 90, 91, and then withdraw them downward through the open lower end of the chamber.

These baffles or panels 88 and 89 also function to prevent excessive heating of the fat in the pan 60. They do this because their lower, adjacent edges 98, 99 (FIGURES 4 and 4a) project toward one another and are thus close together and act to reduce the area of the pan which is exposed to the radiant heat. The panels also insulate and prevent the walls 68 and 69 from becoming heated excessively and conducting the heat downwardly into the fat in the pan.

Circuit

The electrical circuit shown in FIGURE 11 includes a spark gap means 100, one being located adjacent each burner face (FIGURES 3 and 4), these means 100 extending from their ignition boards 101, which may be of the "Fenwal" type. A spark detector 102 operates its relay 103 which in turn closes the circuit. The relays actually can be part of the spark detector, ignition board "package." When all four of the relays (one for each burner) are closed, then the circuit opens the solenoid operated valve V to permit gas to flow through the gas line 104 to the burners. With this arrangement, gas will not be admitted to the chamber unless a spark is present at each burner face to cause ignition of the gas.

Another alternative wiring circuit could be used. For example, a separate control may be provided for each of the four burners, one solenoid operated gas valve could be used with each burner. Thus the control would be arranged in parallel and in that event, if one burner does not have a spark, it will not receive any gas, but the other burners will still function.

We claim:

1. A food broiler comprising, a broiling chamber having a horizontal front side opening through which food can be loaded into and out of the broiling chamber; a rack extending outwardly from said broiler and adjacent and below said opening; a bun pan positionable on said rack and directly adjacent said opening, said pan having means on which bun halves are pre-positionable; a grill for supporting rows of food thereon and slidable on said rack from (1) a position directly adjacent said opening in which the food on said grill is directly above said bun halves, to a (2) position to one side of said broiler; said grill also being slidable into and out of said chamber; and a push-off frame shiftably mounted on said broiler between (1) a push-off position in which said frame is located between rows of food on said grille and (2) a position in which said frame is raised clear of said grill and food thereon; whereby when said grill is positioned on said rack directly above said bun halves, said push-off frame can be shifted between said rows of food on said grill, and said grill can then be slid horizontally to cause said food to be pushed off said grill upon contact with said frame and directly onto the respective bun halves of said food.

2. The combination set forth in claim 1 including a door carried by said frame and swingable therewith, said door arranged to cover said opening when said frame is in said push-off position.

3. In combination with a food broiler having a broiling chamber subject to intense heat and having a horizontal side opening through which food can be loaded and out of the broiling chamber; a loading and unloading rack extending outwardly from said broiler and adjacent and below said opening, said rack having transverse guideways; a bun pan positionable on said rack and directly adjacent said opening, said pan having means on which bun halves are pre-positionable; a food grill for supporting food thereon and slidable on said guideways from (1) a position directly adjacent said opening in which the food on said grill is directly above said bun halves, to a (2) position to one side of said broiler; and a push-off frame having individual members and shiftably mounted on said broiler between (1) a push-off position in which said members are located between rows of food on said grill and (2) a position in which said frame is raised clear of said grill and food thereon; said grill also being slidable into and out of said chamber; whereby when said grill and food thereon are positioned on said rack directly above said bun halves, said push-off frame can be shifted to locate its members between said rows of food on said grill, and said grill can then be slid away to cause said food to be pushed off said grill upon contact with said members and directly onto the respective bun halves of said food.

4. The combination set forth in claim 3 including a door carried by said frame and swingable therewtih, said door arranged to cover said opening when said frame is in said push-off position.

5. A food broiler comprising, a broiling chamber, means for substantially tightly closing said chamber against the entry of excess air, infra-red heat generating means in said chamber for subjecting said chamber to intense heat, said chamber having a horizontal opening in its front side through which food can be loaded into and out of the broiling chamber, duct means for exhausting gases out of said chamber and so sized so as to prevent any appreciable flow of air through said chamber; a rack extending outwardly from said broiler and adjacent and below said opening; a bun pan positionable on said rack and directly adjacent said opening and having means on which bun halves are pre-positionable; a grill for supporting food in rows thereon and slidable on said rack from (1) a position directly adjacent said opening in which the food on said grill is directly above said buns, to a (2) position to one side of said broiler, said grill also being slidable into and out of said chamber; and a push-off frame having individual members and shiftably mounted on said broiler between (1) a push-off position in which said members are located between rows of food on said grill and (2) a position in which said frame is raised clear of said grill and food thereon; a door carried by said frame and swingable therewith, said door arranged to cover said horizontal opening when said frame is in said push-off position to thereby maintain said chamber substantially tightly closed; whereby when said grill is positioned on said rack directly above said bun halves, said push-off frame can be shifted to locate its members between said rows of food on said grill, and said grill can then be slid horizontally to cause said food to be pushed off said grill upon contact with said members and directly onto the respective bun halves of said food.

6. A food broiler having a broiling chamber subject to intense heat and having a horizontal opening in its front side through which food can be loaded into and out of the broiler chamber, said broiler comprising, a loading and unloading rack extending outwardly from said broiler and adjacent and below said opening, said rack having a first pair of transverse guideways and also a second pair of transverse guideways below said first pair; a bun pan positionable on said rack and dirctly adjacent said opening and slidable on said second pair of guideways, said pan having means on which bun halves are pre-positionable; a food grill for supporting food thereon and slidable on said second pair of guideways from (1) a position directly adjacent said opening in which the food on said grill is directly above said bun halves, to a (2) position to one side of said broiler; and a push-off frame having individual members and shiftably mounted on said broiler between (1) a push-off position in which said members are located between rows of food on said grill and (2) a position in which said frame is raised clear of said grill and food thereon; said chamber having a pair of longitudinal guideways therein and in alignment with said opening; said grill being slidable on said longitudinal guideways and into and out of said chamber; whereby when said grill and food thereon are positioned on said rack directly above said bun halves, said push-off frame can be shifted to locate its members between said rows of food on said grill, and said grill can then be slid horizontally to cause said food to be pushed off said grill upon contact with said members and directly onto the respective bun halves of said food.

7. The combination set forth in claim 6 including a door carried by said frame and swingable therewith, said door arranged to cover said opening when said frame is in said push-off position.

8. A food broiler comprising, a broiling chamber having a horizontal opening in its front side through which food can be loaded into and out of said chamber, food loading and unloading rack mechanism extending outwardly from said broiler and adjacent and below said opening, a food engaging frame shiftably mounted on said broiler and movable between (1) a food engaging position on said rack mechanism and (2) a position clear of said mechanism, said frame having a door secured thereto and for movement therewith, said door acting to close said opening when said frame is in said food engaging position and exposing said opening for food movement therethrough when said frame is moved to its position clear of said mechanism.

9. The broiler set forth in claim 8 including, an exhaust duct at the top of said broiler and sized so as to create a slight negative pressure in said chamber.

References Cited

UNITED STATES PATENTS

| | | | |
|---|---|---|---|
| 2,614,483 | 10/1952 | Scofield | 99—393 |
| 2,626,575 | 1/1953 | Whitsel | 107—1 |
| 2,917,990 | 12/1959 | Ehrenberg | 99—386 |
| 2,997,941 | 8/1961 | Phelan et al. | 99—400 XR |
| 3,193,663 | 7/1965 | Budzich et al. | |
| 3,266,442 | 8/1966 | Udall et al. | 107—1 |
| 3,267,924 | 8/1966 | Payne | 99—391 XR |
| 3,343,689 | 9/1967 | Feaely | 214—6 |

BILLY J. WILHITE, *Primary Examiner.*